(12) United States Patent
Zheng et al.

(10) Patent No.: US 10,574,312 B2
(45) Date of Patent: Feb. 25, 2020

(54) APPARATUS AND METHODS FOR INTERFERENCE CANCELLATION IN MULTI-ANTENNA RECEIVERS

(71) Applicant: NXP USA, Inc., Austin, TX (US)

(72) Inventors: Xiayu Zheng, San Jose, CA (US);
Hongyuan Zhang, Fremont, CA (US);
Sudhir Srinivasa, Campbell, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/163,167

(22) Filed: Oct. 17, 2018

(65) Prior Publication Data

US 2019/0253111 A1 Aug. 15, 2019

Related U.S. Application Data

(60) Provisional application No. 62/630,120, filed on Feb. 13, 2018.

(51) Int. Cl.
| | |
|---|---|
| H03H 7/40 | (2006.01) |
| H04B 7/0452 | (2017.01) |
| H04B 17/345 | (2015.01) |
| H04L 25/03 | (2006.01) |
| H04B 17/318 | (2015.01) |

(52) U.S. Cl.
CPC ......... *H04B 7/0452* (2013.01); *H04B 17/318* (2015.01); *H04B 17/345* (2015.01); *H04L 25/03159* (2013.01); *H04L 25/03891* (2013.01)

(58) Field of Classification Search
CPC ......... H04L 25/03038; H04L 25/03057; H04L 5/0051; H04B 7/0626

USPC .............. 375/232, 260, 267; 370/201, 286
See application file for complete search history.

(56) References Cited

U.S. PATENT DOCUMENTS

| | | | |
|---|---|---|---|
| 7,209,522 B1 | 4/2007 | Shirali | |
| 7,242,720 B2 * | 7/2007 | Sugiyama | H04L 1/06 375/260 |

(Continued)

OTHER PUBLICATIONS

"Notice of Allowance", U.S. Appl. No. 15/672,117, dated May 2, 2019, 7 pages.

(Continued)

*Primary Examiner* — Khai Tran

(57) ABSTRACT

The present disclosure describes apparatuses and methods for interference cancellation in multi-antenna receivers. In some aspects, a packet transmitted through a wireless environment is received via multiple antennas of a receiver, the packet being affected by interference of the wireless environment. The receiver multiplies signals of the packet with an interference cancellation matrix to provide reduced-interference signals of the packet from which a first portion of the interference is removed. Based on a first set of the reduced-interference signals of the packet, the receiver provides a reduced-interference channel estimate. A second portion of the interference is then removed from a second set of the reduced-interference signals using the reduced interference channel estimate. By so doing, the receiver may reduce effects of interference of the wireless environment (e.g., interfering packets or signals) to improve receive performance (e.g., bit-error rate) for packets that are intended for reception by the receiver.

20 Claims, 10 Drawing Sheets

(56) References Cited

U.S. PATENT DOCUMENTS

| | | | |
|---|---|---|---|
| 7,826,337 B2* | 11/2010 | Shi | H04B 7/2606 |
| | | | 370/201 |
| 8,995,543 B2* | 3/2015 | Fechtel | H04L 25/0224 |
| | | | 375/259 |
| 9,209,873 B1 | 12/2015 | Zhang et al. | |
| 10,389,414 B1 | 8/2019 | Qi et al. | |
| 10,397,933 B1 | 8/2019 | Mu et al. | |
| 2006/0274691 A1 | 12/2006 | Naguib et al. | |
| 2007/0030914 A1 | 2/2007 | Ding et al. | |
| 2007/0249296 A1 | 10/2007 | Howard et al. | |
| 2009/0180404 A1 | 7/2009 | Jung et al. | |
| 2012/0127889 A1 | 5/2012 | Yomo et al. | |
| 2012/0288021 A1 | 11/2012 | Park et al. | |
| 2013/0016767 A1 | 1/2013 | Pean et al. | |
| 2016/0234042 A9 | 8/2016 | De Victoria | |
| 2016/0285525 A1 | 9/2016 | Budianu et al. | |
| 2017/0214429 A1 | 7/2017 | Eistein et al. | |
| 2018/0006690 A1 | 1/2018 | Shepard et al. | |
| 2018/0270038 A1 | 9/2018 | Oteri et al. | |

OTHER PUBLICATIONS

"Pre-Interview Communication", U.S. Appl. No. 15/849,213, dated Feb. 6, 2019, 3 pages.

"First Action Interview Office Action", U.S. Appl. No. 15/611,050, dated Oct. 19, 2018, 3 pages.

"Pre-Interview Communication", U.S. Appl. No. 15/672,117, dated Jan. 15, 2019, 3 pages.

"Amendment 4: Enhancements for Very High Throughput for Operation in Bands below 6 GHz", IEEE Std 802.11ac-2013, 2012, 425 pages.

"Amendment 5: Enhancements for Higher Throughput", 2007, 536.

"Pre-Interview Communication", U.S. Appl. No. 15/611,050, dated Aug. 10, 2018, 3 pages.

Bellalta, "IEEE 802.11ax: High-Efficiency WLANs", Accepted for publication in IEEE Wireless Communications Magazine. Jul. 2015, Jul. 2015, 16 pages.

Mu, et al., "Utility U.S. Appl. No. 15/849,213, filed Dec. 20, 2017", 46 pages.

"Pre-Interview Communication", U.S. Appl. No. 16/176,147, dated Nov. 29, 2019, 4 Pages.

* cited by examiner

APPARATUS AND METHODS FOR INTERFERENCE CANCELLATION IN MULTI-ANTENNA RECEIVERS

CROSS REFERENCE TO RELATED APPLICATIONS

This present disclosure claims priority to U.S. Provisional Patent Application Ser. No. 62/630,120 filed Feb. 13, 2018, the disclosure of which is incorporated by reference herein in its entirety. This present disclosure is also related to U.S. patent application Ser. No. 15/849,213 filed Jan. 23, 2018, the disclosure of which is also incorporated herein in its entirety.

BACKGROUND

Many computing and electronic devices access the Internet or other resources through wireless networks, which are typically provided and administered by an access point or network management entity. As wireless device density and data usage levels increase, wireless network architects have developed communication techniques to increase spectrum efficiency. In other words, the architects have worked to increase the number of devices that can access and the amount of data exchanged through physical resources of a wireless network. To do so, some wireless networking systems implement spatial reuse in which network spectrum is reused for devices that are separated by distance or directionality. For example, two wireless networks may operate using same or similar channels when respective base stations and devices of the two wireless networks are separated geographically or directionally.

When not sufficiently separated by distance or direction, however, transmission signals from devices of one network may interfere with other devices of another network that are configured to use the same or similar (e.g., overlapping) wireless channels for communication. Such situations may commonly arise as more devices are added to adjacent wireless networks, mobile devices move throughout a wireless network resulting in directional conflicts, or at boundaries of the wireless network where transmission power is maximized to reach far away devices. Because an interfering transmitter is typically not part of or controlled by the other wireless network, devices subject to the interference are unable to provide the transmitter with feedback (e.g., to reduce transmit power) and the interfering transmissions can continue unabated. As such, these interfering transmissions typically impair reception performance of devices in other wireless networks, which can result in lower receive performance or reduced network throughput due to the interference.

SUMMARY

This summary is provided to introduce subject matter that is further described in the Detailed Description and Drawings. Accordingly, this Summary should not be considered to describe essential features nor used to limit the scope of the claimed subject matter.

In some aspects, an interference canceller implements a method that receives, via multiple antennas of a device, a packet transmitted through a wireless environment, the packet being affected by interference of the wireless environment. The method then determines, based on the interference of the wireless environment, an interference cancellation matrix and multiplies signals of the packet with the interference cancellation matrix. This multiplication provides reduced-interference signals of the packet from which a first portion of the interference is removed. Based on a first set of the reduced-interference signals, a channel of the wireless environment is estimated to provide a reduced-interference channel estimate. The method then removes, based on the reduced-interference channel estimate, a second portion of the interference from a second set of the reduced-interference signals of the packet. By so doing, the interference canceller may reduce effects of the interference of the wireless environment to improve receive performance (e.g., bit-error rate) for packets that are intended for reception by the device.

In other aspects, an apparatus for wireless communication is described that includes multiple antennas and a receiver having multiple inputs coupled to respective ones of the multiple antennas. The receiver is configured to receive data in a wireless environment in which the apparatus operates. The apparatus also includes a frequency domain equalizer and an interference canceller configured to receive, via the multiple antennas, a packet transmitted through the wireless environment, the packet being affected by interference of the wireless environment. The interference canceller determines, based on the interference of the wireless environment, an interference cancellation matrix and multiplies signals of the packet with the interference cancellation matrix to provide reduced-interference signals of the packet from which a first portion of the interference is removed. Based on a first set of the reduced-interference signals, a channel of the wireless environment is estimated to provide a reduced-interference channel estimate. The interference canceller then removes, based on the reduced-interference channel estimate and with the frequency domain equalizer, a second portion of the interference from a second set of the reduced-interference signals of the packet.

In yet other aspects, a System-on-Chip (SoC) is described that includes an orthogonal frequency-division multiplexing-based (OFDM-based) receiver having multiple receive chains and a hardware-based processor. The SoC also includes a memory storing processor-executable instructions that, responsive to execution by the hardware-based processor, implement an interference canceller to receive, via the multiple receive chains, a packet transmitted through a wireless environment that includes interference, the packet being affected by the interference of the wireless environment. The interference canceller is also implemented to access an interference cancellation matrix stored in the memory or another memory of the SoC and multiply signals of the packet with the interference cancellation matrix to provide reduced-interference signals of the packet from which a first portion of the interference is removed. The interference canceller then estimates a channel of the wireless environment based on a first set of the reduced-interference signals of the packet to provide a reduced-interference channel estimate. Based on the reduced-interference channel estimate, the interference canceller removes a second portion of the interference from a second set of the reduced-interference signals of the packet.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of interference cancellation in multi-antenna receivers are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
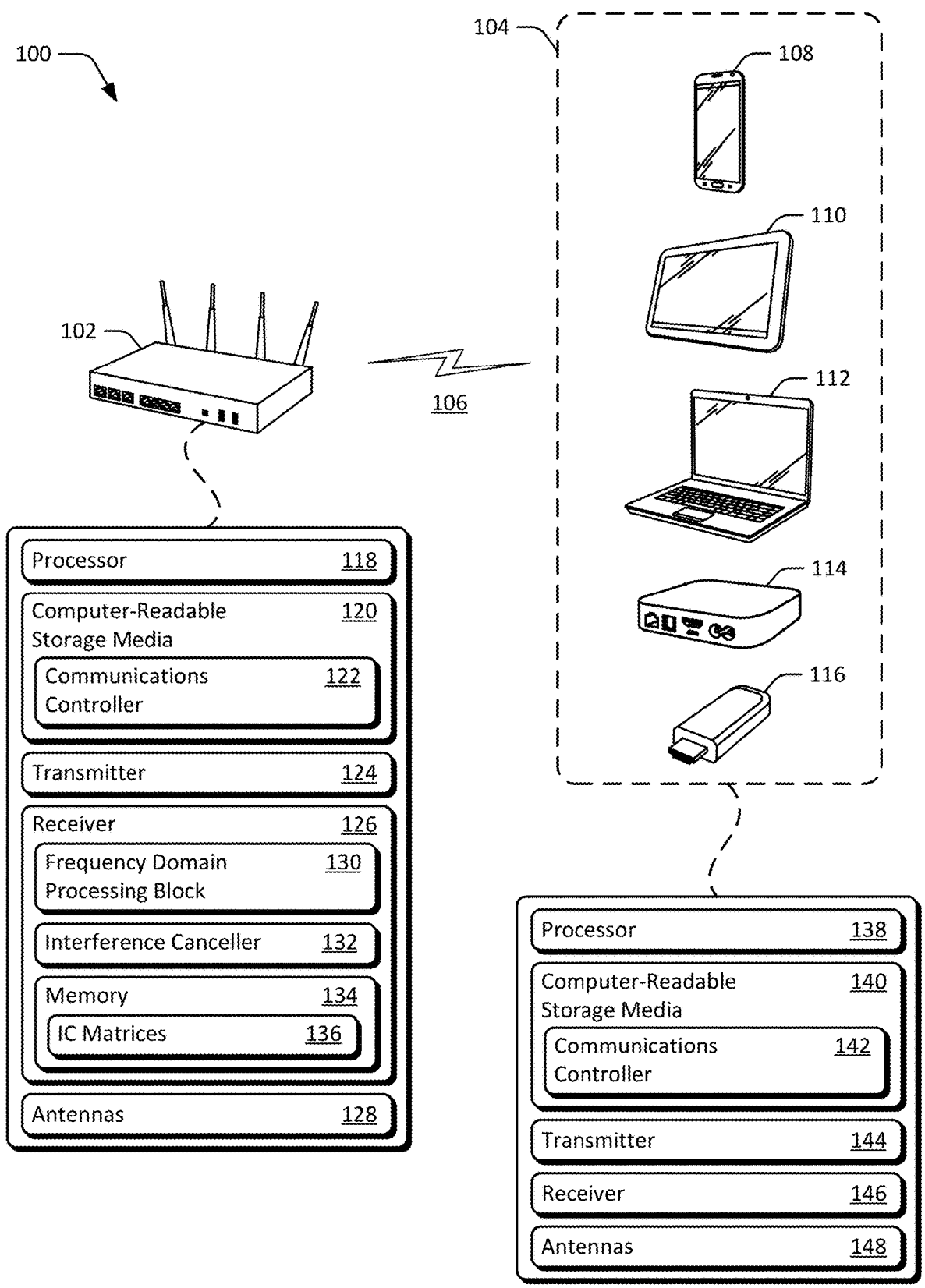
FIG. 1 illustrates an example operating environment having devices that are capable of wireless communication in accordance with one or more aspects.

Conventional techniques of spatial reuse often result in directional or geographical overlap between wireless networks or respective devices thereof. For example, when communicating proximate an edge or boundary of a wireless network, a base station or client stations may use maximum transmission power when transmitting data packets to a receiving device. These maximum power transmissions often travel into adjacent wireless networks, where the transmissions can cause interference (e.g., co-channel interference) with devices of another network configured to operate on a same or similar frequency. Alternately or additionally, transmissions beamformed (e.g., steered) toward a target device may interfere with other devices proximate the target device or within an approximate transmission path of the beamformed transmissions.

In the context of a wireless local-area-network (WLAN), a basic service set (BSS) of stations, such as an access point and client stations, communicate at a physical (PHY) layer over a given channel of wireless spectrum. With spatial reuse, transmissions of similar frequency that originate from a proximate BSS, or overlapping BSS (OBSS), can interfere with stations of the BSS listening for or attempting to receive data. Because other stations of the OBSS cannot receive feedback from the stations of BSS receiving the interference, the OBSS often continues transmission of interfering packets or interfering signals despite impairing receive performance (e.g., bit-error rate) of the BSS stations. As such, conventional techniques of spatial reuse and network mapping may result in OBSS interference (e.g., co-channel interference) that impairs station receiver performance or reduces throughput of a wireless network.

This disclosure describes techniques and apparatuses for interference cancellation in multi-antenna receivers. In some aspects, a packet transmitted through a wireless environment is received via multiple antennas of a receiver, the packet being affected by interference of the wireless environment. The receiver multiplies signals of the packet with an interference cancellation matrix to provide reduced-interference signals of the packet from which a first portion of the interference is removed. Based on a first set of the reduced-interference signals of the packet, the receiver provides a reduced-interference channel estimate. A second portion of the interference is then removed from a second set of the reduced-interference signals using the reduced interference channel estimate. By so doing, a receiver may reduce effects of interfering packets or signals of the wireless environment to improve performance (e.g., bit-error rate) for packets that are intended for reception by the device.

These and other aspects described herein may be performed to enable the cancellation or suppression of interference associated with packets (or signals) transmitted by devices of an OBSS or other sources of co-channel interference (e.g., BlueTooth® devices). For example, a receiver of a access point operating near an OBSS may listen for and receive packets transmitted by a client device (e.g., laptop or smart-phone) of a BSS that is provided and managed by the access point. These packets, however, may be received with or affected by interference associated with transmissions of another access point or other devices of the OBSS. Based on the interference in the environment, such as the interfering packets, an interference canceller of the receiver of the access point can calculate or determine an interference cancellation matrix that is useful to cancel at least some of the interference caused by the interfering transmissions originating from the OBSS.

Generally, the interference cancellation matrix can be used to implement frequency domain processing of packets intended for reception by the access point of the BSS. For example, signals or subcarriers of the intended packets can be multiplied by the interference cancellation matrix to provide reduced-interference signals or subcarriers of the packet. Based on a first set of the reduced-interference signals or subcarriers, a channel estimate can be determined for the environment in which the access point is operating, including the interference caused by the OBSS. The interference canceller can then remove, from a second set of the reduced-interference signals or subcarriers, a second portion of the interference effective to cancel out more interference effects caused by interfering packets originating from the OBSS, thereby improving receiver performance of the access point. These are but a few examples of the ways in which aspects of interference cancellation for multi-antenna receivers may improve receive performance of a wireless device.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment

FIG. 1 illustrates an example of an operating environment 100 having a host device 102 (e.g., access point) and client devices 104 that are capable of communicating data, symbols, packets, protocol data units (PDUs), and/or frames over a wireless connection 106, such as a wireless-local-area network (WLAN). The WLAN may operate in accordance with one or more Institute of Electronics and Electrical Engineers (IEEE) 802.11 standards, such as IEEE 802.11b (e.g., legacy standards), IEEE 802.11a, IEEE 802.11g, IEEE 802.11n, IEEE 802.11ac, IEEE 802.11ad, IEEE 802.11ax, IEEE 802.11ay, IEEE 802.11-2016, or the like. Alternately or additionally, the wireless connection 106 or other wireless connections of the devices may be implemented as a personal area network (PAN, e.g. IEEE 802.15), peer-to-peer network, mesh network, or cellular network, such as set forth in a 3rd Generation Partnership Project Long-Term Evolution (3GPP LTE) specification.

In this example, the host device 102 is embodied as an access point (AP) that is capable of providing and managing a wireless network, such as a wireless fidelity network (WiFi network) in accordance with any of the IEEE 802.11 standards, that includes one or more wireless connections 106 with respective client devices 104. In other cases, the host device 102 may include or be embodied as an enhanced node access point, set-top box, wireless router, broadband router, modem device, gaming device, or other network administration device. The client devices 104 of the example environment 100 include a smart-phone 108, tablet computer 110, laptop computer 112, set-top box 114, and multimedia stick 116, any of which may also be referred to as stations (STAs, e.g., mobile- or fixed-STAs) of the wireless network. Although not shown, other configurations of the client devices 104 are also contemplated, such as a desktop computer, a server, gaming controllers, wearable smart-device, television, content-streaming device, high-definition multimedia interface (HDMI) media stick, wearable-computers, smart appliance, home automation controller, smart thermostat, Internet-of-Things (IoT) device, mobile-internet device (MID), a network-attached-storage (NAS) drive, mobile gaming console, and so on.

Generally, the host device 102 provides connectivity to the Internet, other networks, or networked-resources through a backhaul link (not shown), which may be either wired or wireless (e.g., a T1 line, fiber optic link, broadband cable network, intranet, a wireless-wide-area network). The backhaul link may include or connect with data networks operated by an internet service provider, such as a digital subscriber line or broadband cable provider and may interface with the host device 102 via an appropriately configured modem (not shown). While associated with the host device 102 via the wireless connection 106, the smart-phone 108, tablet computer 110, laptop computer 112, set-top box 114, or multimedia stick 116 may access the Internet, communicate with each other, or access other networks for which host device 102 acts as a gateway.

The host device 102 includes a processor 118 configured to execute processor-executable instructions and computer-readable storage media 120 (CRM 120). In some cases, the processor 118 is implemented as an application processor or baseband processor to manage operation and connectivity of the host device 102. The CRM 120 of the host device 102 may include any suitable type and/or combination of storage media, such as read-only memory (ROM), random access memory (RAM), or Flash memory. The CRM 120 may store firmware, an operating system, or applications of the host device 102 as instructions that are executed by the processor 118 to implement various functionalities of the host device 102. In this example, a communications controller 122 for managing communication operations of the host device 102 is embodied on the CRM 120.

In some cases, the communications controller 122 is implemented in whole or part as a baseband processor, digital signal processor (DSP), or wireless interface controller of a host device 102 or access point. The communications controller 122 may include or represent any suitable combination of components to enable various communication operations, such as a precoder, channel sounder, beamforming module, multiple-input multiple-output (MIMO) module, spatial stream processor, or the like. Although not shown, the communication controller 122 may include, control, or interface with components for implementing one or more aspects for interference cancellation in multi-antenna receivers as described herein. The implementations and/or uses of the communications controller 122 vary, and are described throughout the disclosure.

The host device 102 also includes a transmitter 124, receiver 126, and antennas 128 for providing a wireless network, communicating with the client devices 104, or communicating other wirelessly-enabled devices. The transmitter 124 or receiver 126 may include any suitable number of respective communication paths (e.g., transmit or receive chains) to support transmission or reception of multiple spatial streams of data. Although not shown, radio frequency (RF) front-end circuitry of the host device 102 can couple or connect the transmitter 124 or receiver 126 to the antennas 128 to facilitate various types of wireless communication. The antennas 128 of the host device 102 may include an array of multiple antennas that are configured similar to or differently from each other (e.g., internal and/or external antennas).

In this example, the receiver 126 of the host device 102 also includes or is operably coupled with a frequency domain processing block 130, an interference canceller 132, and a memory 134, which may be used to calculate or store interference cancellation (IC) matrices 136. Generally, a component of the frequency domain processing block 130 (e.g., interference estimator) or interference canceller 132 may estimate interference for one or more channels of a wireless environment based on interference packets or interference signals received by the receiver 124. The interference canceller 132 may calculate or generate interference cancellation matrices 136 based on the received interference. The interference canceller 132 can then use the interference cancellation matrices 136 to suppress or cancel interference, such as interference caused by interference packets or interference signals subsequently transmitted from the source of the interference. When interference cancellation is implemented by a host device 102, instances of a frequency domain processing block 130, interference canceller 132, and/or interference cancellation matrices 136 can be implemented by or through the communications controller 122. The implementations and uses of these entities vary, and are described throughout the disclosure.

Each of client devices 104 (e.g., station devices or STAs) includes a processor 138 and computer-readable storage media 140 (CRM 140). The processor 138 can be any suitable type of processor, either single-core or multi-core, for executing instructions or code associated with applications and/or an operating system of the client device 104. The CRM 140 may include any type and/or combination of suitable storage media, such as RAM, non-volatile RAM (NVRAM), ROM, or Flash memory useful to store data of applications and/or an operating system of the client device 104.

In this example, each client device 104 may also include a communication controller 142, which can embodied on the CRM 140 and implemented via a hardware-based processor (e.g., software defined radio). In some cases, the communications controller 142 is implemented in whole or part as a baseband processor, digital signal processor (DSP), or wireless interface controller of a client device 104. The communications controller 142 may include, represent, and/or control any suitable combination of components to enable various communication operations, such as a precoder, channel sounder, beamforming module, multiple-input multiple-output (MIMO) module, spatial stream processor, decoder, or the like. Although not shown, the communication controller 142 may also include components for implementing one or more aspects for interference cancellation in multi-antenna receivers as described herein. The implementations and/or uses of the communications controller 142 vary, and are described throughout the disclosure.

Each of the client devices 104 also includes a transmitter 144, receiver 146, and antennas 148 for communicating with the host device 102 or other wirelessly-enabled devices. Although shown as separate entities, the transmitter 144 and receiver 146 may be implemented in combination as a transceiver component that supports both transmit and receive functionalities. The transmitter 144 or receiver 146 may include any suitable number of respective communication paths (e.g., transmit or receive chains) to support transmission or reception of multiple spatial streams of data. In some cases, the receiver 146 of the client device 104 is implemented with functionalities or components for implementing aspects for interference cancellation in multi-antenna receivers, which are described throughout this disclosure. Front-end circuitry (not shown) of the client device 104 may couple or connect the transmitter 144 or receiver 146 to the antennas 148 to facilitate various types of wireless communication. The antennas 148 may include an array of multiple antennas that are configured similar to or differently from each other.

Figure 2:
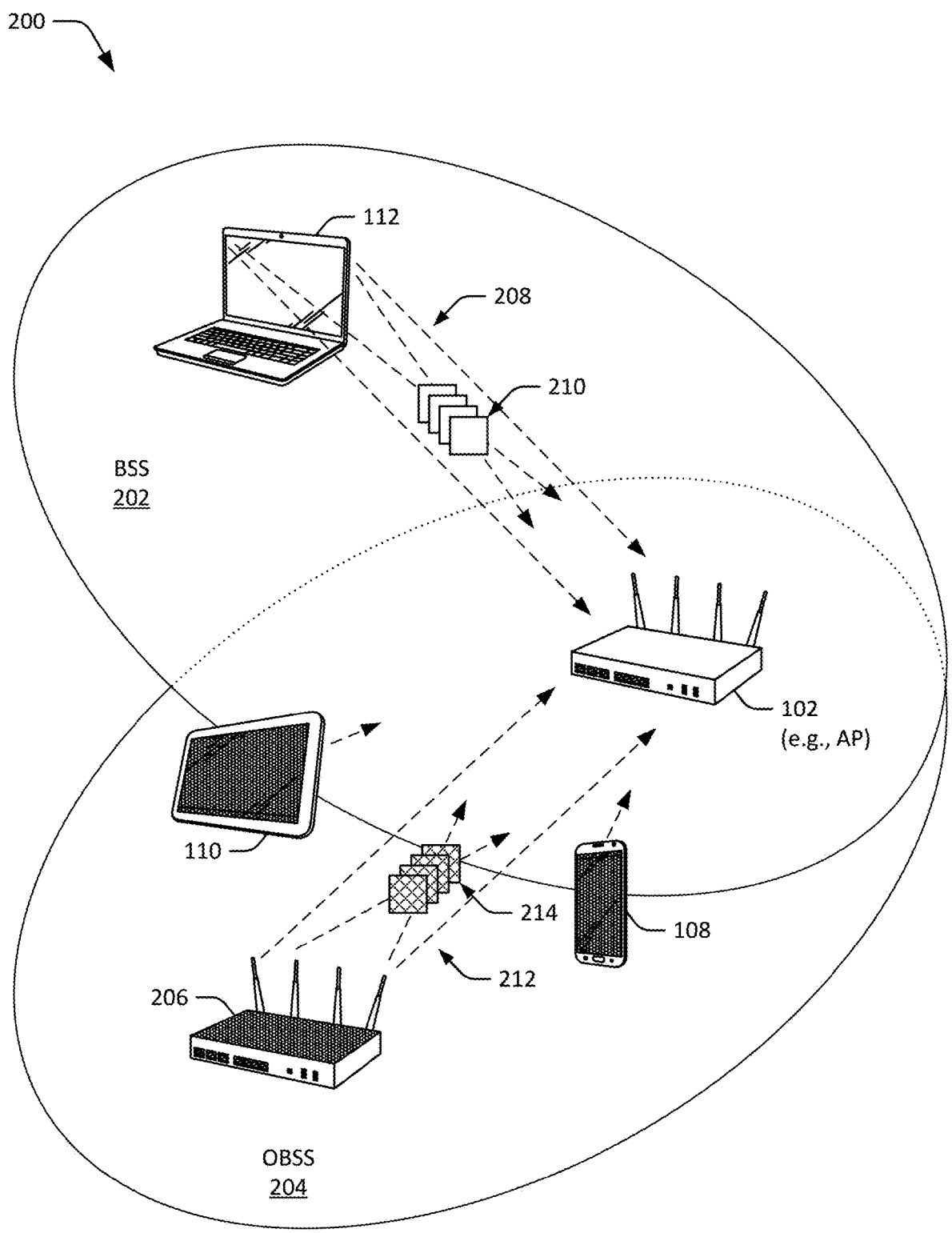
FIG. 2 illustrates an example wireless networking environment that includes devices of a basic service set and an overlapping basic service set.

FIG. 2 illustrates example wireless networking environment 200 that includes devices of a basic service set 202 (BSS 202) that is provided by the host device 102 (e.g., access point). The wireless network environment 200 also includes an overlapping BSS 204 (OBSS 204) that is managed by an access point 206 and includes a smart-phone 108 and tablet computer 110 (e.g., interfering devices). As shown in FIG. 2, respective communication areas of the BSS 202 and the OBSS 204 overlap such that devices or stations of either network may be within range of other devices or stations of the other network. Here, assume that laptop 112 is associated with the host device 102 and communicates as part of the BSS 202. The BSS 202 and/or OBSS 204 may be provided or managed in accordance with any suitable wireless communication protocol or standard, such as IEEE 802.11b, IEEE 802.11g, IEEE 802.11n, IEEE 802.11a IEEE 802.11ac, IEEE 802.11ad, IEEE 802.11ax, IEEE 802.11ay, IEEE 802.11-2016, or the like. Although shown as including infrastructure type WiFi networks, the networking environment 200 may also be implemented with one or more of a peer-to-peer network, mesh network, personal area network, or cellular network. For example, interfering packet or interfering signals may originate from a PAN or Bluetooth link implemented between other devices proximate the BSS 202.

In various aspects, one or more devices of the wireless networking environment 200 may also be configured to implement multiple-input multiple-output (MIMO) communications. As shown in FIG. 2, the laptop 112 can transmit multiple spatial streams 208 by which packets 210 are encoded for transmission to the host device 102. Here, the packets 210 may be referred to as intended packets, which are intended for reception by the host device 102. Generally, intended communications or data are exchanged between devices or stations of a same BSS, a shared wireless connection, or a same wireless network, such as BSS 202. With reference to a physical (PHY) layer of the 802.11 standard, transceivers of the devices may implement a Physical Layer Convergence Procedure (PLCP) sublayer for communicating frames or packets. The PLCP sublayer may prepare a frame for transmission by taking the frame from the media access control (MAC) sublayer and creating a PLCP Protocol Data Unit (PPDU) packet. A physical medium dependent (PMD) sublayer of the PHY then modulates and transmits the packet data as bits or a bit stream. Accordingly, any data, packet, or frame described herein may include a protocol data unit (PDU), MAC PDU (MPDU), PLCP service data unit (PSDU), PLCP PDU (PPDU), or the like.

The wireless networking environment also includes the overlapping basic service set 204, which includes the access point 206, smart-phone 108, and tablet computer 110, which may be located proximate or within the BSS 202. Generally, the access point 206 communicates with the other devices or clients of the OBSS 204 using various transmission techniques, such as beamforming. In the context of this example, however, the access point 206 is an interfering transmitter or source of interference for the devices of BSS 202. Here, assume that the smart-phone 108 of the OBSS 204 is located approximately between the access point 206 of the OBSS 204 and the host device 102 (or any other device) of the BSS 202. Spatial streams 212 transmitted by the access point 206 that include packets 214 can interfere (e.g., interfering packets or interference packets) with communication operations of the host device 102. As such, transmitted signals or other communications originating from devices of the OBSS 204 may be referred to as interfering signal, interfering packets, or generally as interference for the host device 102 or other devices of BSS 202. As such, this interference originating from the devices of the OBSS 204 may impair or degrade receiver performance of the devices of the BSS 202 that are attempting to communicate intended packets or information. Similar to packets 210, the interfering packets 214 may include any suitable type of packet or frame, such as a PDU, MPDU, PSDU, PPDU, or the like.

Figure 3:
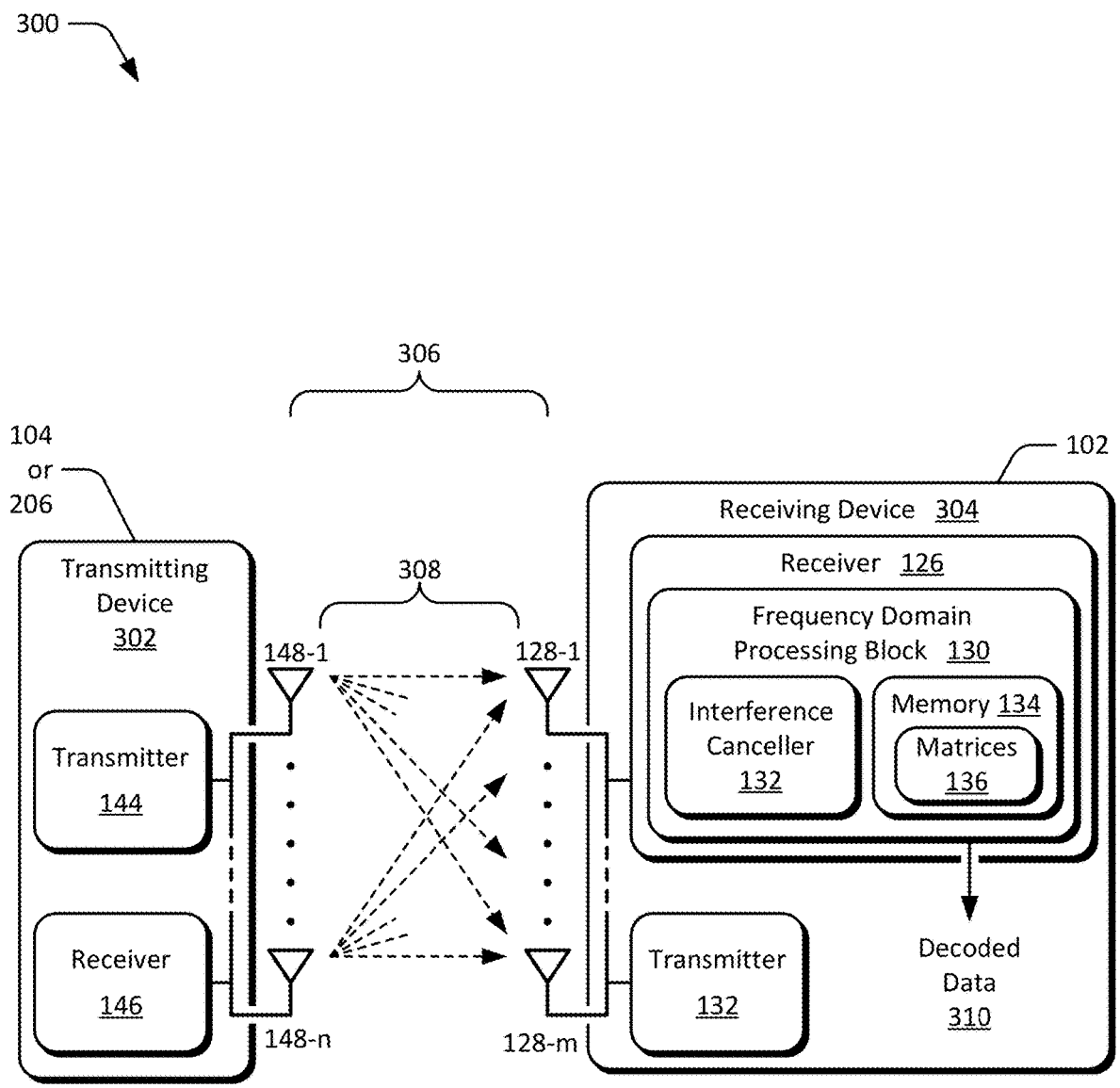
FIG. 3 illustrates example configurations of the devices of FIG. 1 that are implemented as a transmitting and a receiving device, which includes an interference canceller.

FIG. 3 illustrates example configurations of a client device 104 (or interfering access point 206) and a host device 102 at 300 that are implemented as a transmitting device 302 and receiving device 304, respectively. In this example, the client device 104 is shown as the transmitting device 302 and the host device 102 (e.g., access point) is shown as the receiving device 304, though these roles may be reversed depending on a direction of communication and/or interference reception. For the context of this discussion, the transmitting device 302 may also be embodied as an interfering transmitter (e.g., access point 206) or a device that transmits interfering signals or packets, such as interfering spatial streams 212 or interfering packets 214.

In some aspects, the transmitting device 302 and receiving device 304 communicate via channel 306 of a wireless environment (e.g., wireless medium), such as air, the atmosphere, or other media through which electromagnetic (EM) waves propagate. A channel 306 between the transmitting device 302 and the receiving device 304 (e.g., one of the client devices 104) may be characterized by information that describes conditions or a state of the channel. In some cases, this channel state information (CSI) is useful to adjust or refine transmission or reception parameters of signals transmitted or received through the channel 306 by respective ones of the devices. To determine the conditions or state of the channel 306, the receiving device 304 may implement interference sensing or detection operations by which the channel 306 is characterized (e.g., measured) prior to the reception of spatial streams (e.g., signal or data streams) from an intended transmitter.

In aspects of interference cancellation in multi-antenna receivers, a receiver 126 includes a frequency domain processing block 130 that may implement operations or calculations in the frequency domain for signal processing. The frequency domain processing block 130 may, or include a component to, estimate interference channel state information that describes conditions associated with interference caused by transmissions of an interfering device in a wireless environment. Here, assume that the transmitter 302 is the access point 206 of the OBSS, which transmits interfering spatial streams 212 and interfering packets 214 while devices of the BSS 202 attempt to communicate.

As shown in FIG. 3, spatial streams 308 of the transmitting device 302, which may include the interfering spatial streams 212 and/or packets 214, are transmitted via the antennas 148-1 through 148-n of the transmitter 144. Across the channel 306 of the wireless environment, the receiving device 304 receives one or more of spatial streams 308 that have been affected by conditions of the channel 306, such as distance, fading, multipath reflections, and the like. The receiver 126 can receive or detect each of the spatial streams 308 (or packets) at the antennas 128-1 through 128-m of the receiving device 304. Thus, the receiver 126 of the receiving device 304 can obtain channel information (e.g., channel response) about respective signal paths between a transmitter, such as an interfering transmitter, and each of the antennas 128-1 through 128-m at which the interference is received.

The receiver 126 coupled to the antennas 128-1 through 128-m may provide any or all received spatial streams, packet, or signals to the frequency domain processing block 130 or interference canceller 132 for analysis or pro. In some aspects, an interference estimator (not shown) of the frequency domain processing block 130 or an orthogonal frequency-division multiplexing-based (OFDM-based) receiver estimates an interference channel or interference channel state information based on the received spatial streams, packets, or signals. This interference channel may include state information about, describe, or characterize interference caused by an interfering transmitter operating in the wireless environment, such as the access point 206 or another device of the OBSS 204. The interference channel may be associated with a particular interfering device, such that the interference estimator may estimate or provide multiple respective interference channels associated with each of multiple interfering devices.

The interference canceller 132 of the receiving device 304 may use the interference channel to generate interference cancellation matrices 136 (IC matrices 136) for suppressing or cancelling the interference from received packets, subcarriers, signals, of the like. The interference cancellation matrices 136 may be calculated in or stored to the memory 134 of the receiver 126, or a memory or buffer associated with the receiver 126. For example, the receiver 126 may implement carrier sensing to detect transmission of intended packets by the client devices 104 of BSS 202 or another device with which the receiving device 304 is associated. In such cases, the interference canceller 132 may suppress, based on the interference channel, interference caused by an interfering transmitter while carrier sensing is performed. When other spatial streams or packets are received, such as intended packets, the interference canceller 132 may cancel at least a portion of interference received with the intended packets using the estimated interference channel. In some cases, after interference cancellation, the interference canceller 132 provides the spatial streams to an equalizer for equalization and then a demodulator (not shown) for demodulation and decoding to provide demodulated spatial streams or decoded data 310 for use by the receiving device 304. Alternately or additionally, with the interference channel information, carrier sensing implemented by the receiver 126 can be modified such that the modified carrier sensing of the receiver 126 is not incorrectly triggered by the interference signal.

Figure 4:
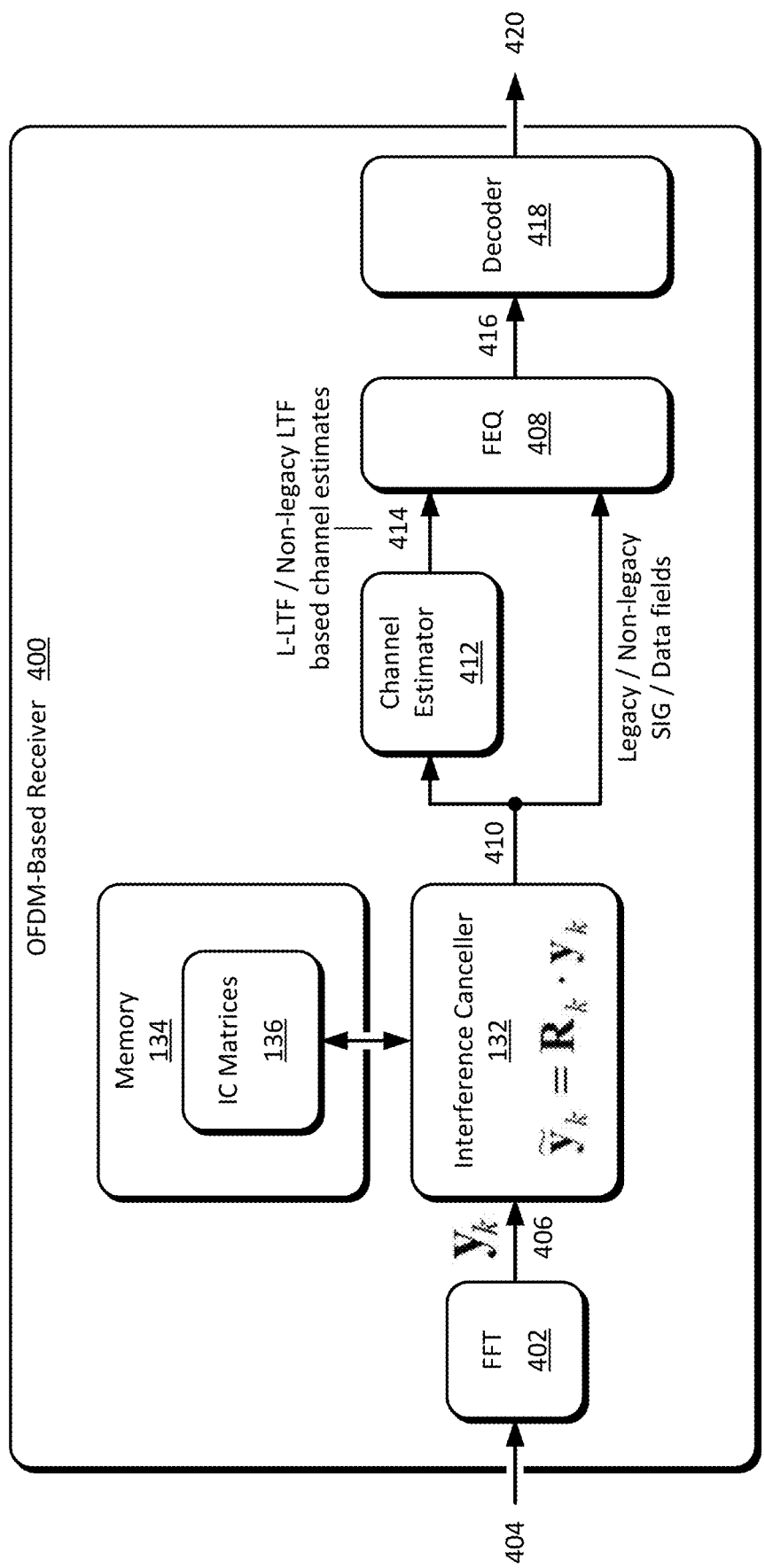
FIG. 4 illustrates an example configuration of an orthogonal frequency-division multiplexing (OFDM) receiver capable of performing interference cancellation.

FIG. 4 illustrates an example configuration of an orthogonal frequency-division multiplexing-based (OFDM-based) receiver 400 capable of performing interference cancellation. The OFDM-based receiver 400 or components of the OFDM-based receiver 400 may be implemented in any suitable device, such as a host device 102 (e.g., access point) or a client device 104 as described herein. Generally, the components of the OFDM-based receiver 400 are configured to implement interference cancellation in a multi-antenna receiver for a variety of packet types or formats, such as those communicated in accordance with various IEEE 802.11 standards as described throughout the disclosure. Further, although described in the context of an OFDM-based receiver, the components or techniques described may be implemented in any suitable type of receiver or transceiver.

In this example, the OFDM-based receiver 400 includes a Fast Fourier Transform block 402 (FFT 402) configured to receive sampled signals 404 of data packets at an input of the OFDM-based receiver 400. The FFT block 402 is implemented to perform FFT operations on various fields or portions of the received packets, such as to convert those fields, portions, or packets to the frequency domain. For example, after a packet is detected via carrier sensing and synchronized at a legacy short training field (L-STF), the FFT block 402 can perform FFT on later fields of the packet for subsequent processing in the frequency domain. Alternately or additionally, the FFT block 402 can be implemented as an FFT interface, FFT module, FFT unit, or FFT processor. Although not shown, an input of the OFDM-based receiver 400 can be operably coupled to one or more receive chains of any suitable signal processing or conditioning components, such as a mixer, a filter (e.g., low-pass filter or band-pass filter), a variably gain amplifier, an analog-to-digital converter, a serial-to-parallel converter, or the like. The receive chain can be coupled to or includes component of an RF front end that is in turn coupled with the antennas 128 or antennas 148.

The FFT block 402 may provide received signal vectors 406 ($y_k$) to an interference canceller 132 of the OFDM-based receiver 400, which may also be referred to as an interference cancellation block (IC block), a receive interference cancellation block (RIC block), or RIC processor. Generally, the interference canceller 132 is configured to determine or provide one or more interference cancellation matrices 136 ($R_k$), which are useful to cancel or reduce interference from received packets to provide a noise-cancelled signal vector ($\hat{y}_k$) or reduced-interference signals from which a portion of the interference is removed. The ways in which an interference cancellation matrix are calculation are not limited to those described herein (e.g., per-tone cancellation), and may include any suitable calculation method or use, such as noise whitening or noise scaling. Here, note that use of matrix-based interference cancellation may not conflict or cause performance issues with beamforming on a transmit side of a wireless communication system.

As shown in FIG. 4 and equation 1, for the k-th tone or subcarrier, the interference canceller 132 can provide noise-cancelled signal vectors (ỹ$_k$) or reduced-interference signals through the use of the interference cancellation matrices 136 (R$_k$).

$$\tilde{y}_k = R_k \cdot y_k \quad \text{Equation 1: Interference Cancellation for Received Signal Vectors (i)}$$

With respect to the interference cancellation matrices 136 (R$_k$), the interference canceller 132 may calculate and/or store these matrices to the memory 134 or another memory associated with the OFDM-based receiver 400. In some cases, the interference cancellation matrix 136 (R$_k$) is a complex matrix, which may be precalculated for a pre-defined bandwidth (e.g., entire channel bandwidth) based on the interference channel information. Alternately or additionally, the interference cancellation matrix 136 is stored in the memory 134 for usage by the interference canceller 132, which may update the interference cancellation matrix 136 as much as once per interference channel change. As shown in equation 2, an amount of the memory required to store one of the interference cancellation matrices 136 may be represented as (M) bits, where N$_b$ is the precision of imaginary and real parts for each complex element, N$_r$ is the number of receive antennas, and N$_{IC}$ is the number of interference cancellation matrices 136 stored in the memory 134.

$$M = 2 \cdot N_b \cdot N_r^2 \cdot N_{IC} \quad \text{Equation 2: Memory Size for Storing Interference Cancellation Matrices}$$

In some cases, an interference cancellation matrix 136 is stored for each data subcarrier or pilot subcarrier of a received packet (e.g., N$_{IC}$=N$_{sc}$, where N$_{sc}$ is the number of subcarriers). In other cases (e.g., N$_{IC}$<N$_{sc}$), tone grouping (e.g., N$_G$) may be implemented to reduce the number of subcarriers to be stored, such as to provide one submatrix from multiple subcarriers (e.g., four subcarriers to one stored submatrix). In such cases, however, tone grouping may implement or rely on interpolation of an interference cancellation matrix 136, such as copying from a neighboring matrix, linear interpolation, or the like, before multiplying the interference cancellation matrix 136 with signals over all of the subcarriers. Thus, a number of the interference cancellation matrices 136 to be stored in the memory 134 is configurable (e.g., through the interference canceller 132) to balance any tradeoffs between performance (e.g., desired bit-error rate improvement) and requisite memory (e.g., area cost, power consumption, or area availability for the memory). Alternately or additionally, different tone mappings between interference cancellation matrices 136 and signals of data subcarriers may implemented (or required) for each field of different packet type as described in detail below.

Returning to FIG. 4, the interference canceller 132 can be configured such that an interference packet effect or portion thereof is removed at a frequency domain equalizer 408 (FEQ 408) of the OFDM-based receiver 400. For example, for various long training fields (LTFs), such as legacy LTF (L-LTF), high-throughput LTF (HT-LTF), very-high-throughput LTF (VHT-LTF), or a high efficiency LTF (HE-LTF), the interference canceller 132 can provide post-interference cancellation signals 410 (post-IC signals 410, e.g., noise-cancelled signal vectors) to a channel estimator 412 for use in channel estimation. In some cases, the post-IC signals 410 are interference-reduced signals from which a portion of the interference is removed through application of the interference cancellation matrix.

Alternately or additionally, the interference canceller 132 can provide other fields of the packets with reduced-interference signals (e.g., non-STF or non-LTF fields) to the FEQ 408 with corresponding channel estimation 414 provided by the channel estimator 412 for use in signal equalization. In some cases, corresponding channel estimates based on the L-LTF or non-legacy LTF fields are passed to the FEQ 408 to cancel or remove additional interference from signals of packet fields (e.g., legacy or non-legacy SIG and data fields) that are passed directly to the FEQ 408. As such, equalization performed in the frequency domain by the FEQ 408 based on a reduced-interference channel estimate may be effective to cancel or remove additional interference from the L-SIG or non-legacy SIG or data fields passed to the FEQ 408. After equalization at the FEQ 408, equalized signals 416 (e.g., noise-cancelled equalized signals) are sent to a decoder 418 of the OFDM-based receiver 400, which is configured to provide decoded data 420 for use or further processing by a device in which the OFDM-based receiver 400 is embodied.

Figure 5:
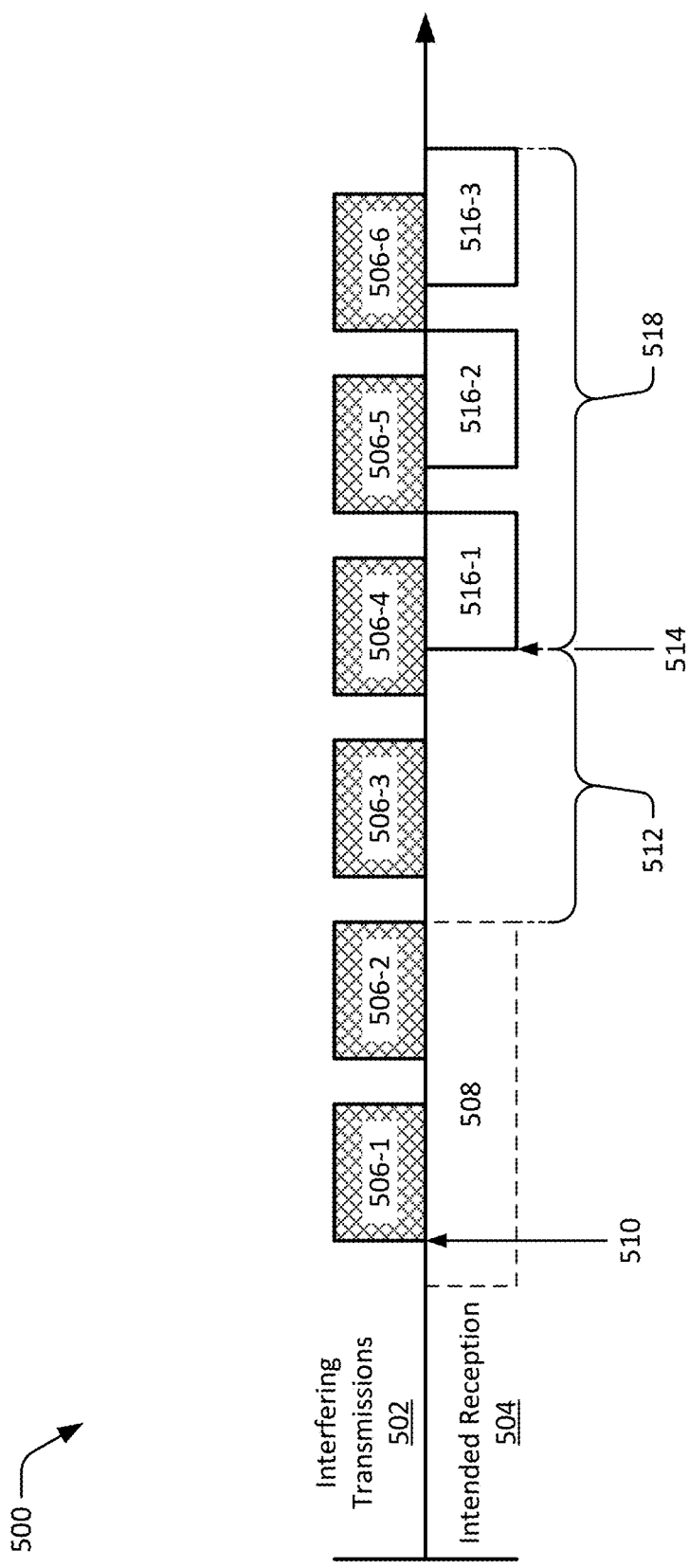
FIG. 5 illustrates an example timeline of packet communication in which aspects of interference cancellation can be implemented.

FIG. 5 illustrates an example timeline 500 of packet communication in which aspects of interference cancellation can be implemented. For visual clarity, interfering transmissions 502 are shown above the timeline 500 and intended reception 504 is shown below the timeline 500. Here, assume that in interfering transmitter, such as a client device or STA of an OBSS, transmits a stream of interfering packets 506-1 through 506-6 while a receiver 126 of an access point listens for intended packets from another client device with which the access point is associated. To do so, the receiver of the access point (e.g., host device 102) may be configured to use carrier sensing (or modified carrier sensing) to detect interfering packets and/or signals for a duration of time 508.

As shown in FIG. 5, an interference packet 506-1 is received by the receiver and detected by the receiver at 510, and an interference canceller 132 of the receiver 126 (or receiver 400) may start to estimate the interference channel (Ĥ$_i$) or interference channel information. Generally, the interference channel described in reference to FIG. 5 may be useful to calculate or generate the interference cancellation matrices 136 that are described throughout the disclosure. Based on the reception of one or more interference packets (or signals), the interference canceller 132 may estimate or generate an interference channel or interference matrix as shown by equation 3. Alternately or additionally, the interference canceller 132 may implement, based on the estimate interference channel, modified carrier sensing or adaptive carrier sensing such that interfering packets are suppressed and intended packets are received to allow detection or triggering for receive operations.

Here, assume that the number of spatial streams (N$_{SS\,Total}$) and the number of receive antennas (N$_{RX}$) are the same, though the interference channel or interference matrix may be non-square (e.g., N$_{SS\,Total}$ and N$_{RX}$ being different) in other instances. As shown in equation 3, the interference channel matrix may have dimensions that are defined based on N$_{SS\,Total}$ and N$_{RX}$.

$$\hat{H}_i, \text{ where a size of } \hat{H}_i \text{ is } N_{RX} \times N_{SS\,Total} \quad \text{Equation 3: Interference Channel Matrix } \hat{H}_i$$

With respect to a spatial stream dimension limitation of the interference channel with an intended channel, the interference sources selected for cancellation may be selected based on strength or limited as shown in equation 4. In this equation, N$_{ss,i}$ may represent a number of data streams of interferers, N$_{ss,0}$ can represent a number of data streams intended for or required by a receiving device (e.g., number of self-data streams of device of interest), and as noted $N_r$ may represent a number of receive antennas of the device of interest.

Spatial Streams Limitations for an Interference Channel    Equation 4

$$N_{ss,0} + \sum_{i=1}^{L} N_{ss,i} \leq N_r$$

Given equation 4, in some implementations stronger ones of the interfering signals are chosen for cancellation, such as to maximize cancellation effectiveness, and a number of interferers L chosen may be limited by the spatial stream or data stream parameters of the terms of equation 4. Based on the interference channel matrix, the receiver 126 can implement carrier sensing at 512 to listen for intended packets. The carrier sensing with interference suppression may be initiated after an interference channel is estimated, which suppresses the interferer packets while still permitting reception of other packets, such as those intended for the access point. As shown at 514, the carrier sensing is triggered by an intended packet 516-1, at which point reception of the intended packet 516-1 is initiated by the receiver 126 of the access point.

To cancel interference caused by the interfering packets 506-4 through 506-6, the interference canceller 132 can generate interference cancellation matrices 136 ($R_k$) based on the interference channel ($\hat{H}_i$). In some cases, the interference cancellation matrices 136 ($R_k$) are generated through or using a per-tone cancellation that is performed to zero-force the interference signal, though any other suitable calculation or operation may be used.

Here, let $y_k$ again represent a received signal vector and $\hat{H}_{i,k}$ represent the estimated interference channel on the k-th tone. The interference cancellation matrices 136 ($R_k$) can be calculated and used by the interference canceller 132 for interference cancellation in the spatial or frequency domain to provide noise-cancelled signal vector ($\tilde{y}_k$) as shown in equation 5.

$R_k = \text{null}(\hat{H}_{i,k})$, where $\text{null}(\hat{H}_{i,k})\hat{H}_{i,k} = 0$, and $\tilde{y}_k = R_k \cdot y_k$    Equation 5: Interference Cancellation for Received Signal Vectors (ii)

In the context of the OFDM-based receiver 400 of FIG. 4, the noise-cancelled signal vector $\tilde{y}_k$ is provided to other receive processing components of the receiver, such as the FEQ 408, decoder 418, a demodulator, or the like. Alternately or additionally, the noise-cancelled signal vectors can be sent to other signal processing or demodulation components of the receiver 126, such as to provide decoded data for use by a device in which the receiver is embodied.

Figure 6:
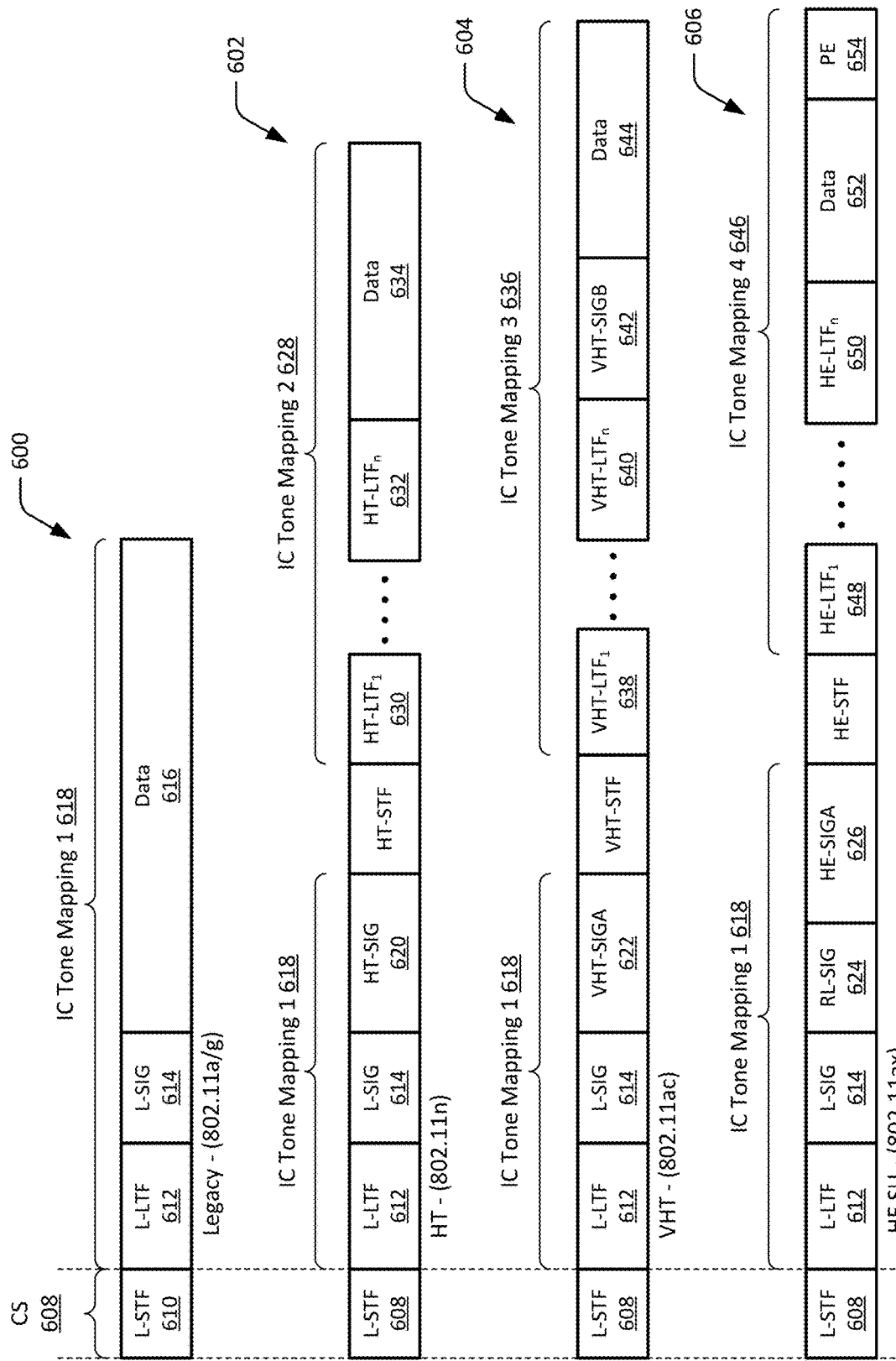
FIG. 6 illustrates example tone mappings of respective types of wireless packets that can be performed in accordance with one or more aspects.

FIG. 6 illustrates example tone mappings of respective types of wireless packets that can be performed in accordance with one or more aspects of interference cancellation in multi-antenna devices. In some cases, the interference canceller 132 may implement or preform different tone mappings or signal processing for different types or formats of data packets. As shown in FIG. 6, the interference canceller 132 may implement one or more tone mapping schemes for a legacy packet 600, an HT packet 602, a VHT packet 604, or an HE packet 606. Here, note that aspects of interference cancellation may not be limited to the types of packets shown and may be applied to any suitable packet type (e.g., other IEEE 802.11ax packet types).

For packets formatted in accordance with various IEEE 802.11 standards or wireless fidelity (WiFi) packets, carrier sensing 602 (CS) can be performed on a legacy short training field 610 (L-STF) as shown in FIG. 6. In some cases, the L-STF 610 is used for carrier sensing, signal timing, analog-to-digital conversion (ADC), or the like. The legacy packet also includes legacy long training field 612 (L-LTF 612), legacy signal field 614 (L-SIG 614), and data fields 616 (data 616). In aspects of interference cancellation, carrier sensing operation can be modified based on interference channel information or an estimated interference channel, such that carrier sensing will avoid false triggers based on interfering packets or interfering signals. This can enable carrier sensing to trigger based on intended packets (e.g., non-interfering packets), and then symbol timing may be conducted to synchronize the packet for subsequent frequency domain processing.

The interference canceller 132 can also determine a one spatial-stream (SS) frequency domain channel estimation based on the legacy long-training field (L-LTF) of a packet. This channel estimate with interference cancellation may be calculated by multiplying with an interference cancellation matrix 136 ($N_r \times N_r$) in each subcarrier as shown in equation 6, where ($N_{sc}^L$) is a number of pilot subcarriers and/or data subcarriers for legacy tone mapping.

$\tilde{y}_k = R_k y_k, k = 1, 2, \ldots, N_{sc}^L$    Equation 6: Channel Estimation with Legacy Tone Mapping In some cases, such as when processing legacy packets of 20 MHz, the number of pilot subcarriers and/or data subcarriers used for tone mapping is 52. The interference cancellation matrix 136 for each subcarrier can be determined based on the interference channel information through zero-forcing as described herein or any other suitable method. For legacy packets (e.g., IEEE 802.11a/g packets), this interference cancellation tone mapping (IC tone mapping 1 618) can also be used for the later L-SIG 614 or data fields 616. For other packet types, such as IEEE 802.11n/ac/ax packets, this channel estimation can be used on a legacy preamble portion of the packet with the same IC tone mapping 1 618 as shown in FIG. 6. Generally, a legacy LTF can be used for channel estimation of reduced-interference signals provided by the interference canceller 132, with the channel estimation performed over a bandwidth of approximately 20 MHz for the L-LTF field. With this channel estimation or reduced-interference channel estimate, the FEQ 408 can equalize other signals from L-SIG or non-legacy SIG or data fields of the packet.

With respect to the other packet types, the IC tone mapping 1 618 (e.g., legacy tone mapping) may include the respective L-LTF 612 and L-SIG 614 fields of each packet, as well as an HT-SIG field 620 for the HT packet 602, a VHT signal A field 622 (SIGA 622) for the VHT packet 604, and an RL-SIG field 624 and HE-SIGA field 626 for the HE packet 606. In some cases, each type of packet may be tone mapped with a different IC tone mapping due to different frame formats and bandwidths. Here, IC tone mapping 2 628 for the HT packet 602 can be performed with an HT-LTF field 1 630 though HT-LTF field n 632 and data field 634.

Alternately or additionally, IC tone mapping 3 636 for the VHT packet 604 can be performed with a VHT-LTF field 1 638 through VHT-LTF field n 640, VHT signal B field 642 (VHT-SIGB 642), and data field 644. As shown in FIG. 6, IC tone mapping 4 646 can be performed with an HE-LTF field 1 648 through HE-LTF field n 650, data field 652, and packet extension field 654 (PE 654). These various tone mapping schemes are provided by way of example only, and can be modified in any suitable way to provide channel estimation for various aspects of interference cancellation. With respect to planning or designing a memory to store the IC matrices 136, consideration may be given to the most advanced communication to be supported by a receiver, which would then enable a one-to-one mapping to provide tone mappings for previous standards or earlier standards. For example, a station device capable of IEEE 802.11ax communication typically supports bandwidths of up to 80 MHz, thus the memory storage can be planned and optimized (trade-off analysis) to support 80 MHz 802.11ax IC Tone Mapping 4 646 as shown in FIG. 6. From the IC tone mapping 4 646, one-to-one mapping can be implemented to provide others of IC Tone Mappings 1-3 based on the IC Tone Mapping 4 that is supported by the memory.

As shown in FIG. 6, for non-legacy packet types (e.g., IEEE 802.11n/ac/ax), a multi-stream or one-stream (depending on a data spatial stream) channel estimation can be determined using the fields followed by a corresponding non-legacy HT/VHT/HE-LTF, such as the HT-SIG, VHT-SIGA, or HE-SIGA. Generally, the interference cancellation matrix 136 may be applied across an entire bandwidth of a corresponding signal of the non-legacy packet as shown in equation 7.

$$\tilde{y}_k = R_k \cdot y_k, k=1,2,\ldots,N_{sc} \quad \text{Equation 7: Channel Estimation with Non-Legacy Tone Mapping}$$

Here, ($N_{sc}$) is the number of pilot subcarriers and/or data subcarriers for or across an entire bandwidth of the corresponding IEEE 802.11 n/ac/ax packet. Although not shown, matrix-based interference cancellation may also be applied to resource units (RUs) in OFDM access systems. As noted, each type of packet may have a different size or bandwidth, with some non-legacy (e.g., IEEE 802.11n/ac/ax) packets having fields with a bandwidth of 40 MHz (HT/VHT/HE), 80 MHz (VHT/HE), or 160 MHz (VHT/HE). As such, some tone mappings (e.g., tone mappings 2-4) are performed over different bandwidths that result in different memory usage. Thus, memory requirements for processing the higher-bandwidth HT, VHT, and HE packets can be greater (size, power, and/or usage) than that the legacy tone mapping 1. In some cases, the memory requirement is designed based on the packet type and bandwidth support which requires the most subcarriers by the device. For example, if the device is 80 MHz and HE capable, the memory requirement will be made based on the 80 MHz IC Tone mapping 4 646 as in FIG. 6. When receiving the other packet types, the IC matrices 136 will be applied based on the corresponding IC Tone mapping from a one-to-one mapping from IC Tone mapping 4.

Techniques for Interference Cancellation in Multi-Antenna Receivers

The following discussion describes techniques for interference cancellation in multi-antenna receivers, which may reduce effects of interfering signals and improve receiver performance. These techniques can be implemented using any of the environments and entities described herein, such as the frequency domain processing block 130, interference canceller 132, or interference cancellation matrices 136. These techniques include methods illustrated in FIGS. 7, 8, and 9, each of which is shown as a set of operations performed by one or more entities.

These methods are not necessarily limited to the orders of operations shown. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, the methods may be combined to implement interference estimation, carrier sensing, and/or interference cancellation operations during in an environment in which an interfering transmitter operates. In portions of the following discussion, reference will be made to the operating environment 100 of FIG. 1, networking environment 200 of FIG. 2, and entities of FIG. 3 and/or FIG. 4 by way of example. Such reference is not to be taken as limiting described aspects to operating environment 100, specific entities, or specific configurations, but rather as illustrative of one of a variety of examples.

Figure 7:
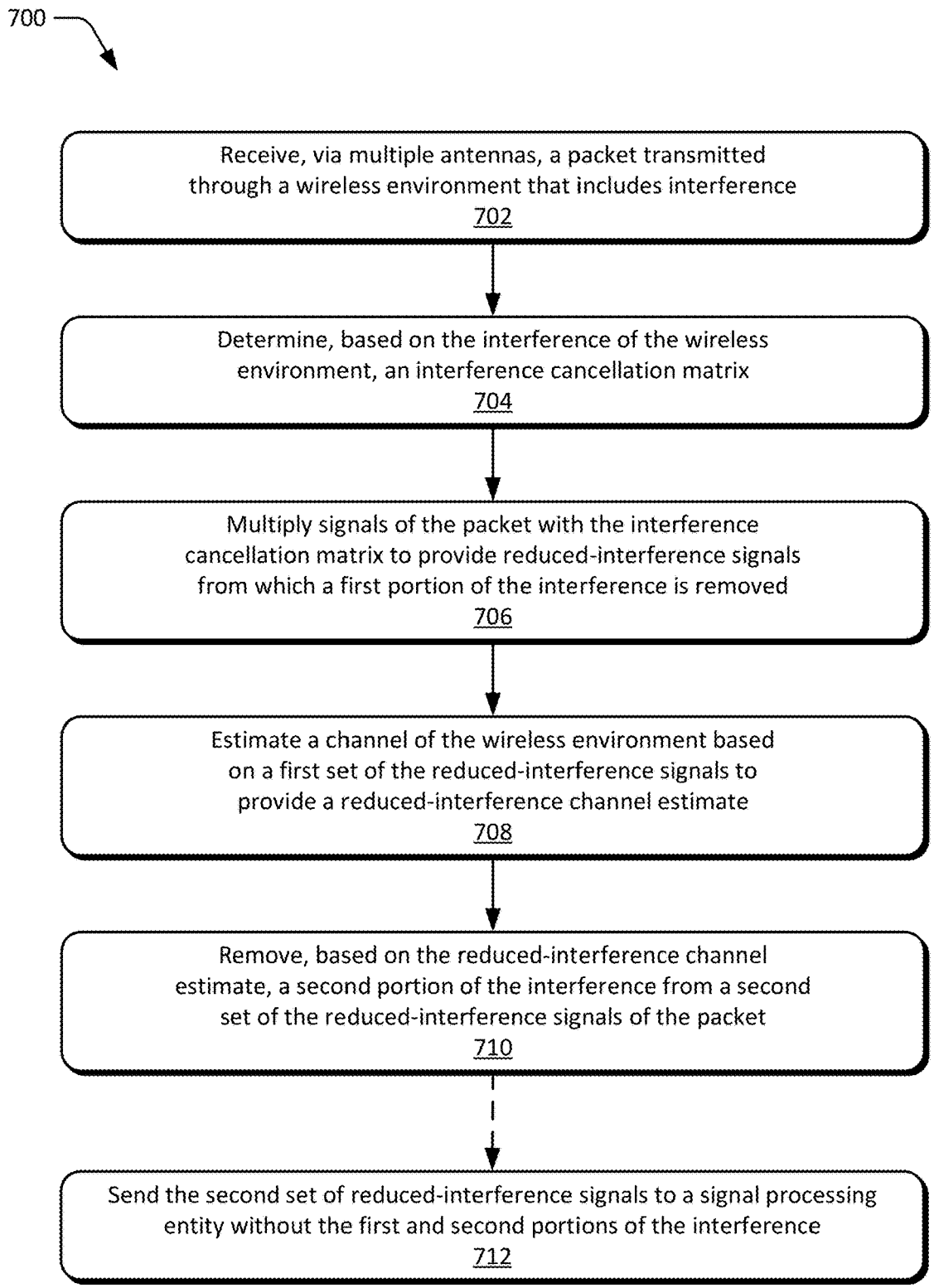
FIG. 7 depicts an example method for interference cancellation in multi-antenna receivers in accordance with one or more aspects.

FIG. 7 depicts an example method 700 for interference cancellation in multi-antenna receivers, including operations performed by the interference canceller 132. For example, an interference canceller 132 of an access point may implement operations of the method 700 to cancel interfering packets or signals originating from another access point or station devices of a proximate OBSS.

At 702, a packet transmitted through a wireless device is received via multiple antennas of a receiver. The packet includes, or is affected by, interference of the wireless environment that can be received with or prior to receiving the packet. In some cases, the interference of the wireless environment is associated with transmissions of an access point or client station of an overlapping basic service set.

At 704, an interference cancellation matrix is determined based on the interference of the wireless environment. In some cases, the interference cancellation matrix is determined based on an inference channel of the wireless environment that is estimated based on previously received interference packets. Alternately or additionally, the interference cancellation matrix can be stored to a memory of the receiver for subsequent use or access.

At 706, signals of the packet are multiplied with the interference cancellation matrix to provide reduced-interference signals from which a first portion of the interference is removed. Alternately or additionally, subcarriers or signal vectors of the packets respective fields can be multiplied with the interference packet to provide noise-cancelled signal vectors or the reduced-interference signals. In some cases, multiplying the signals of the packet with the interference cancellation matrix includes applying the interference cancellation matrix across an entire bandwidth of one or more signal fields of an HT packet, VHT packet, or HE packet. The reduced-interference signals may correspond to long training fields of the packet, such as a first set of reduced-interference signals that correspond to a legacy long training field (L-LTF) or non-legacy long training field (non-legacy LTFs) of the packet. For example, the reduced-interference signals may correspond to a high throughput LTF (HT-LTF), a very high throughput LTF (VHT-LTF), or a high efficiency LTF (HE-LTF) of the packet.

At 708, a channel of the wireless environment is estimated based on a first set of the reduced-interference signals to provide a reduced-interference channel estimate. As noted, the first set of reduced-interference signals may correspond to a legacy long training field (L-LTF) or a non-legacy LTF (e.g., HT-LTF, VHT-LTF, or HE-LTF) of the packet. The channel estimation may be performed after application of the interference cancellation matrix, such that a noise-cancelled channel estimate is provided for use in subsequent operations in the frequency domain.

At 710, a second portion of the interference is removed from a second set of the reduced-interference signals based on the reduced-interference channel estimate. In some cases, the reduced-interference channel estimate is provided to a frequency domain equalizer, which removes the second portions of interference through equalizing the second set of reduced-interference signals. Alternately or additionally, the interference cancellation matrix may be used to perform noise whitening or noise scaling on the signals of the packet or the reduced-interference signals of the packet.

Optionally at 712, the equalized second set of reduced-interference signals is sent to a signal processing entity without the first and second portions of the interference. For example, the equalized signals can be sent to a decoder for decoding to obtain data from the data fields of the packet. In at least some aspects, removing the interference from the packet improves performance of the receiver, such as by reducing a bit-error rate, which may in turn improve decoding performance or data throughput.

Figure 8:
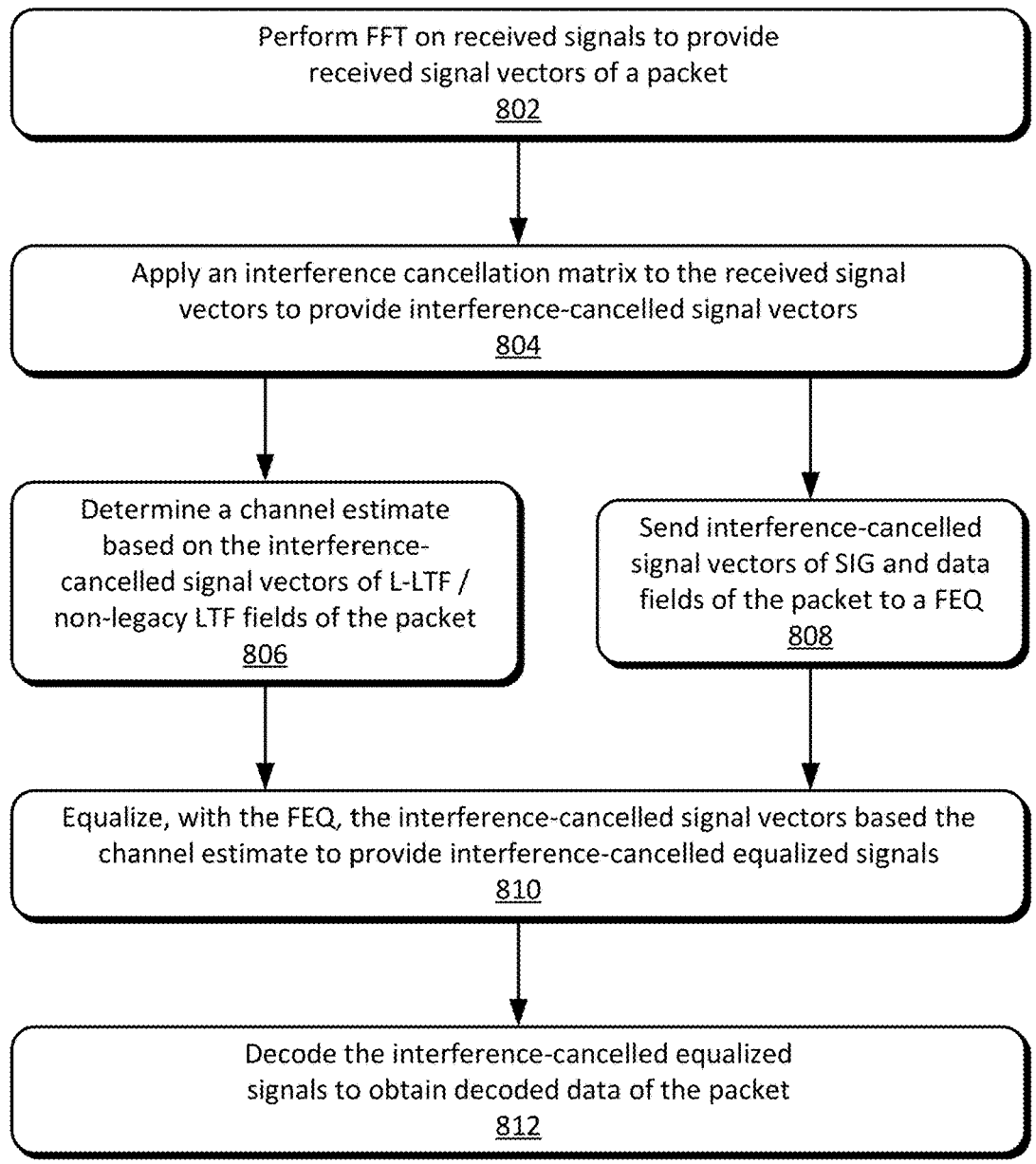
FIG. 8 depicts an example method for processing received packets with an OFDA-based receiver that implements interference cancellation.

FIG. 8 depicts an example method 800 for processing received packets with an OFDA-based receiver that implements interference cancellation, including operations performed by the interference canceller 132.

At 802, a Fast Fourier Transform (FFT) is performed on received signals to provide received signal vectors of a packet. The FFT operations may be performed on various fields or portions of the received packets, such as convert those fields, portions, or packets to the frequency domain. For example, after a packet is detected via carrier sensing and synchronized at a legacy short training field (L-STF), the FFT operations can be performed on later fields of the packet for subsequent processing in the frequency domain.

At 804, an interference cancellation matrix is applied to the received signal vectors to provide interference-cancelled signal vectors. In some cases, the interference cancellation matrix is applied across an entire bandwidth of a non-legacy packet, such as across of 40 MHz (HT/VHT/HE), 80 MHz (VHT/HE), or 160 MHz (VHT/HE). For example, an interference cancellation matrix can be applied to all fields of a packet starting from legacy long training field (L-LTF). Alternately or additionally, tone grouping for the interference cancellation matrix operations may be used to reduce a number of subcarriers to be stored, such as to provide one submatrix from multiple subcarriers (e.g., four subcarriers to one stored submatrix).

At 806, a channel estimate is determined based on the interference-cancelled signal vectors of legacy long training fields or non-legacy LTF fields of the packet, such as to provide a reduced-interference channel estimate. In some cases, channel estimation is determined based on legacy fields, such as L-LTF fields of a legacy packet or non-legacy packet. In such cases, the channel estimate from the L-LTF can be used for tone mapping 1 and/or decoding for legacy SIG, legacy data, or non-legacy SIG fields (e.g., HT-SIG, VHT-SIG, or HE-SIG fields). Alternately or additionally, channel estimation can be determined using non-legacy long training fields, such as an HT-LTF, VHT-LTF, or HE-LTF field of the packet. This non-legacy-based channel estimation from a HT-LTF, VHT-LTF, or HE-LTF field can be used for tone mapping and/or decoding of a VHT-SIGB or data field that follows one of the non-legacy LTFs.

At 808, the interference-cancelled signal vectors of some fields of the packet are sent to a frequency domain equalizer (FEQ). These interference-cancelled signal vectors set to the FEQ may correspond to a legacy SIG field, a legacy data field, a non-legacy SIG field, or a non-legacy data field. Alternately or additionally, corresponding channel estimates based on the L-LTF or non-legacy LTFs can also be passed to the FEQ. By way of example, consider FIG. 4 in which respective paths are shown for various legacy-based and/or non-legacy-based packet fields.

At 810, the interference-cancelled signal vectors are equalized with the FEQ based on the channel estimate or interference-cancelled channel estimate. This can be effective to reduce or remove effects of an interfering signal or packet from the received packet. Alternately or additionally, the interference cancellation matrix may be used to perform noise whitening or noise scaling on the signals of the packet or the reduced-interference signals of the packet.

At 812, the interference-cancelled equalized signals are decoded by a decoder to obtain decoded data of the packet. In at least some aspects, reducing or removing the interference from the signal vectors of packet improves performance of the receiver, such as by reducing a bit-error rate, which may in turn improve decoding performance or data throughput.

Figure 9:
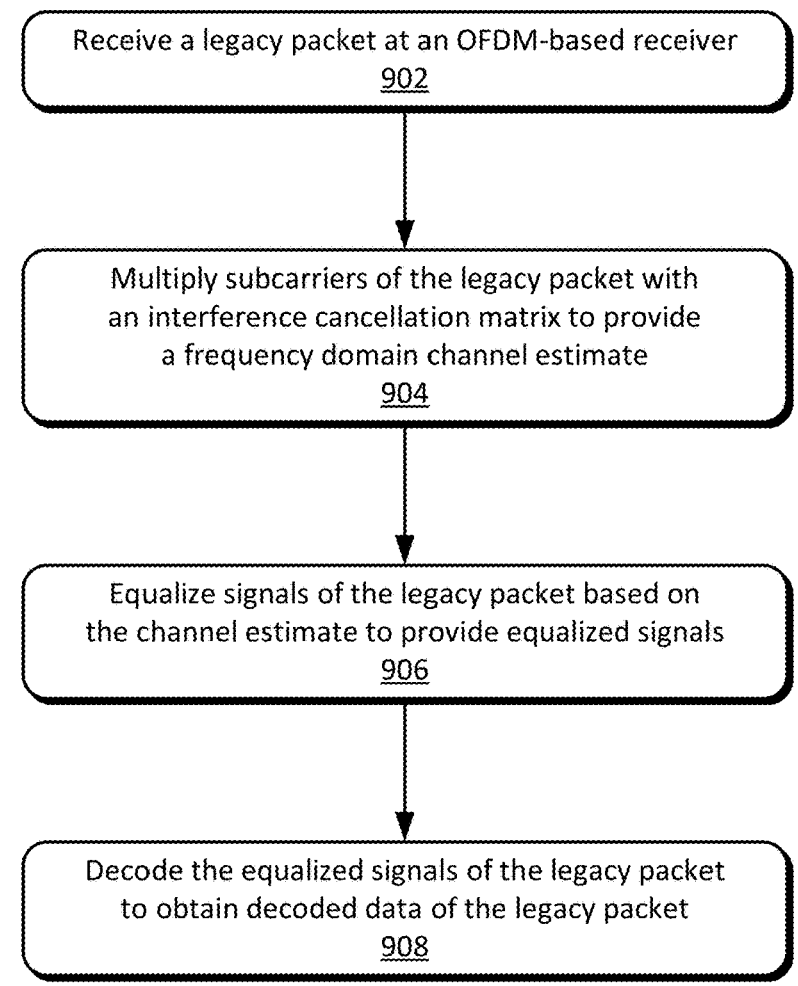
FIG. 9 depicts an example method for cancelling interference in legacy type packets in accordance with one or more aspects.

FIG. 9 depicts an example method 900 for cancelling interference in legacy type packets, including operations performed by the interference canceller 132.

At 902, a legacy packet is received at an OFDM-based receiver. The legacy data packet may be formatted in accordance with any suitable standard, such as the IEEE 802.11a or the IEEE 802.11g standard.

At 904, subcarriers of the legacy packet are multiplied with an interference cancellation matrix to provide a frequency domain channel estimation for the legacy packet. With respect to the legacy packet, a channel estimation with the interference cancellation matrix can be performed for all fields of the legacy packet. For example, the interference cancellation matrix can be applied to a legacy long training field, a legacy signal field, and a data field of the legacy packet.

At 906, signals of the legacy packet are equalized based on the channel estimate to provide equalized signals of the legacy packet. In some cases, post-interference cancelled signal vectors of the legacy packet are provided by an interference canceller to a channel estimator of the OFDM-based receiver.

At 908, the equalized signals of the legacy packet are decoded to obtain decoded data of the legacy packet. For example, the equalized signals of the legacy packet can be sent to a decoder for decoding to obtain data from the data fields of the legacy packet. In at least some aspects, removing the interference from the packet improves performance of the receiver, such as by reducing a bit-error rate, which may in turn improve decoding performance or data throughput.

System-on-Chip

Figure 10:
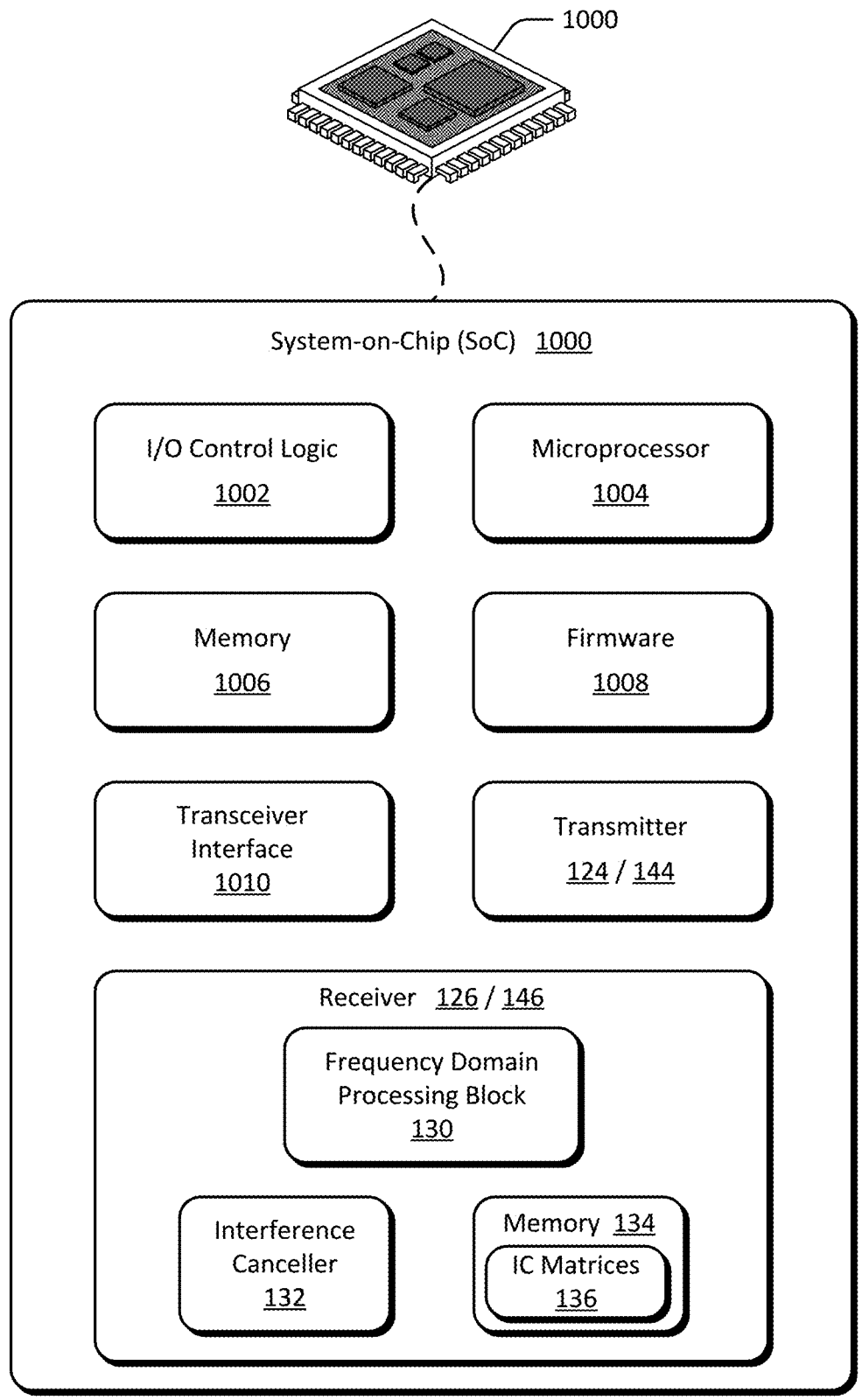
FIG. 10 illustrates an example System-on-Chip (SoC) environment for implementing aspects of interference cancellation in multi-antenna receivers.

FIG. 10 illustrates an exemplary System-on-Chip (SoC) 1000 that can implement various aspects for interference cancellation in multi-antenna receivers. The SoC 1000 can be implemented in any suitable device, such as a host device 102, client device 104, access point, wireless router, enhanced node access point, smart-phone, cellular phone, netbook, tablet computer, network-attached storage, camera, smart appliance, printer, a set-top box, or any other suitable type of device (e.g., others listed herein). Although described with reference to a SoC, the entities of FIG. 10 may also be implemented as an application-specific integrated-circuit (ASIC), chip set, communications controller, application-specific standard product (ASSP), digital signal processor (DSP), programmable SoC (PSoC), system-in-package (SiP), or field-programmable gate array (FPGA).

The SoC 1000 can be integrated with electronic circuitry, a microprocessor, memory, input-output (I/O) control logic, communication interfaces, other hardware, firmware, and/or software useful to provide functionalities of a wireless communication device, such as any of the devices or components described herein. The SoC 1000 may also include an integrated data bus or interconnect fabric (not shown) that couples the various components of the SoC for data communication between the components. The integrated data bus, interconnect fabric, or other components of the SoC 1000 may be exposed or accessed through an external port, such as a Joint Test Action Group (JTAG) port, serial peripheral interface (SPI) port, or other suitable data interface. For example, components the SoC 1000 may communicate or be configured, programmed (e.g., flashed), and/or accessed through the external port at different stages of manufacture, provisioning, deployment, or field service.

In this example, the SoC 1000 includes various components such as input-output (I/O) control logic 1002 (e.g., to include electronic circuitry) and a processor 1004, such as a microprocessor, microcontroller, processor core, application processor, DSP, or the like. The SoC 1000 also includes memory 1006, which can be any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 1104 and code stored on the memory 1006 are implemented as a baseband processor or communications controller to provide various wireless communication functionalities associated with interference cancellation in multi-antenna receivers. In the context of this disclosure, the memory 1006 stores data, instructions, or other information via non-transitory signals, and does not include carrier waves or other transitory signals.

Alternately or additionally, SoC 1000 may comprise a data interface (not shown) for accessing additional or expandable off-chip memory, such as external SRAM or Flash memory. In some cases, the SoC 1000 includes various applications, an operating system, software, and/or firmware, which can be embodied as processor-executable instructions maintained on the memory 1006 for execution by the microprocessor 1004. The SoC 1000 can also include other communication interfaces, controllers, or interfaces, such as a transceiver interface 1010 for controlling or communicating with components of a local on-chip (not shown) or off-chip wireless transceiver. Alternately or additionally, the transceiver interface 1010 may also include or implement a signal interface to communicate RF, intermediate frequency (IF), or baseband frequency signals off-chip to facilitate wireless communication through multiple antennas coupled to the SoC 1000.

The SoC 1000 also includes a transmitter 124 (or 144) and receiver 126 (or 146), which may be implemented separately as shown or combined as a transceiver component. In accordance with various aspects for interference cancellation in multi-antenna receivers, the receiver 126 may include a frequency domain processing block 130, an interference canceller 132, and a memory 134 for calculating or storing IC matrices 136. Any of these entities may be embodied as disparate or combined components, as described with reference to various aspects presented herein. Examples of these components and/or entities, or corresponding functionality, are described with reference to the respective components or entities of the environment 100 of FIG. 1, networking environment 200 of FIG. 2, or respective configurations illustrated in FIG. 3 and/or FIG. 4. The interference canceller 132, either in whole or part, can be implemented as processor-executable instructions maintained by the memory 1006 and executed by the microprocessor 1004 to implement various aspects and/or features for interference cancellation in multi-antenna receivers.

The interference canceller 132, can be implemented independently or in combination with any suitable component or circuitry to implement aspects described herein. For example, the frequency domain processing components, interference canceller 132, or a buffer storing interference cancellation matrices 136 may be implemented as part of a DSP, communication controller, baseband processor, arithmetic logic unit (ALU), matrix processor, decoding block, demodulation block, or the like. The interference canceller 132 may also be provided integral with other entities of SoC 1000, such as integrated with the microprocessor 1004, signal processing block, vector processing block, or transceiver interface 1010 within the SoC 1000. Alternately or additionally, the frequency domain processing block 130, interference canceller 132, IC matrices 136, and/or other components of the SoC 1000 can be implemented as hardware, firmware, fixed logic circuitry, or any combination thereof.

Although the subject matter has been described in language specific to structural features and/or methodological operations, it is to be understood that the subject matter defined in the appended claims is not necessarily limited to the specific examples, features, or operations described herein, including orders in which they are performed.

What is claimed is:

1. A device implemented method comprising:
   receiving, via multiple antennas of the device, a packet transmitted through a wireless environment, the packet being affected by interference of the wireless environment;
   determining, by an interference canceller of the device and based on the interference of the wireless environment, an interference cancellation matrix, the interference canceller implemented at least partially in hardware of the device;
   multiplying signals of the packet with the interference cancellation matrix to provide reduced-interference signals of the packet from which a first portion of the interference is removed;
   estimating, by the interference canceller of the device, a channel of the wireless environment based on a first set of the reduced-interference signals of the packet to provide a reduced-interference channel estimate, the first set of reduced-interference signals of the packet corresponding to one of a legacy long training field (L-LTF) of the packet or a non-legacy LTF of the packet; and
   removing, based on the reduced-interference channel estimate, a second portion of the interference from a second set of the reduced-interference signals of the packet, the second set of reduced-interference signals of the packet corresponding to one of a legacy signal field, a legacy data field, a non-legacy signal field, or a non-legacy data field of the packet.

2. The method as recited in claim 1, further comprising sending the second set of reduced-interference signals of the packet to a signal processing entity without each the first portion of the interference and the second portion of the interference.

3. The method as recited in claim 2, wherein:
   the signal processing entity is a decoder; and
   the method further comprises decoding the second set of reduced-interference signals to provide decoded data from the packet.

4. The method as recited in claim 1, wherein:
   the reduced-interference channel estimate is provided to a frequency domain equalizer; and
   the second portion of the interference is removed from the second set of reduced-interference signals through frequency domain equalization based on the reduced-interference channel estimate.

5. The method as recited in claim 1, wherein:
the non-legacy LTF includes one of a high throughput LTF (HT-LTF), a very high throughput LTF (VHT-LTF), or a high efficiency LTF (HE-LTF); or
the non-legacy signal field includes one of an HT signal field, a VHT signal field, or an HE signal field; or
the non-legacy data field includes one of an HT data field, a VHT data field, or an HE data field.

6. The method as recited in claim 1, wherein:
multiplying the signals of the packet with the interference cancellation matrix includes applying the interference cancellation matrix across an entire bandwidth of one or more signal and data fields of an HT packet, VHT packet, or HE packet; or
the interference cancellation matrix is determined by performing a per-tone cancellation to zero-force a signal representative of the interference.

7. The method as recited in claim 1, further comprising using the interference cancellation matrix to perform noise whitening or noise scaling on the signals of the packet or the reduced-interference signals of the packet.

8. The method as recited in claim 1, wherein the packet is communicated in accordance with one of the Institute of Electronics and Electrical Engineers (IEEE) 802.11n specification, the IEEE 802.11ac specification, the IEEE 802.11ad specification, the IEEE 802.11ax specification, or the IEEE 802.11ay specification.

9. An apparatus for wireless communication comprising:
multiple antennas;
a receiver having multiple inputs coupled to respective ones of the multiple antennas and being configured to receive data in a wireless environment;
a frequency domain equalizer;
an interference canceller configured to:
  receive, via the multiple antennas, a packet transmitted through the wireless environment, the packet being affected by interference of the wireless environment;
  determine, based on the interference of the wireless environment, an interference cancellation matrix;
  multiply signals of the packet with the interference cancellation matrix to provide reduced-interference signals of the packet from which a first portion of the interference is removed;
  estimate a channel of the wireless environment based on a first set of the reduced-interference signals of the packet to provide a reduced-interference channel estimate, the first set of reduced-interference signals of the packet corresponding to one of a legacy long training field (L-LTF) of the packet or a non-legacy LTF of the packet; and
  remove, based on the reduced-interference channel estimate and with the frequency domain equalizer, a second portion of the interference from a second set of the reduced-interference signals of the packet, the first set of reduced-interference signals and the second set of reduced-interference signals corresponding to different fields of the packet, the second set of reduced-interference signals of the packet corresponding to one of a legacy signal field, a legacy data field, a non-legacy signal field, or a non-legacy data field of the packet.

10. The apparatus as recited in claim 9, wherein the receiver is further configured to decode or demodulate the second set of reduced-interference signals of the packet from which the first portion of the interference and the second portion of the interference are removed.

11. The apparatus as recited in claim 9, wherein:
the non-legacy LTF includes one of a high throughput LTF (HT-LTF), a very high throughput LTF (VHT-LTF), or a high efficiency LTF (HE-LTF); or
the non-legacy signal field includes one of an HT signal field, a VHT signal field, or an HE signal field; or
the non-legacy data field includes one of an HT data field, a VHT data field, or an HE data field.

12. The apparatus as recited in claim 9, wherein the interference canceller is further configured to use the interference cancellation matrix to perform noise whitening or noise scaling on the signals of the packet or the reduced-interference signals of the packet.

13. The apparatus as recited in claim 9, further comprising a memory operably coupled with the interference canceller and wherein the interference canceller is further configured to store the interference cancellation matrix to the memory and access the memory to use the interference cancellation matrix.

14. A System-on-Chip (SoC) comprising:
an orthogonal frequency-division multiplexing-based (OFDM-based) receiver that includes multiple receive chains;
a hardware-based processor;
a memory storing processor-executable instructions that, responsive to execution by the hardware-based processor, implement an interference canceller to:
  receive, via the multiple receive chains, a packet transmitted through a wireless environment that includes interference, the packet being affected by the interference of the wireless environment;
  access an interference cancellation matrix stored in the memory or another memory of the SoC;
  multiply signals of the packet with the interference cancellation matrix to provide reduced-interference signals of the packet from which a first portion of the interference is removed;
  estimate a channel of the wireless environment based on a first set of the reduced-interference signals of the packet to provide a reduced-interference channel estimate, the first set of reduced-interference signals of the packet corresponding to one of a legacy long training field (L-LTF) of the packet or a non-legacy LTF of the packet; and
  remove, based on the reduced-interference channel estimate, a second portion of the interference from a second set of the reduced-interference signals of the packet, the first set of reduced-interference signals and the second set of reduced-interference signals corresponding to different fields of the packet, the second set of reduced-interference signals of the packet corresponding to one of a legacy signal field, a legacy data field, a non-legacy signal field, or a non-legacy data field of the packet.

15. The SoC as recited in claim 14, wherein the interference canceller is further implemented to:
determine, based on the interference of the wireless environment, the interference cancellation matrix; and
store the interference cancellation matrix to the memory or the other memory of the SoC from which the interference cancellation matrix is accessed.

16. The SoC as recited in claim 14, wherein:
the OFDM-based receiver is further configured to decode or demodulate the second set of reduced-interference signals of the packet from which the first portion of the interference and second portion of the interference are removed; or the OFDM-based receiver further comprises a frequency domain equalizer and the interference canceller uses the frequency domain equalizer to remove, based on the reduced-interference channel estimate, the second portion of the interference from the second set of the reduced-interference signals of the packet.

17. The SoC as recited in claim 1, wherein the SoC is embodied as or part of a modem processor, media access controller, wireless network interface, access point controller, or wireless communication chipset.

18. The SoC as recited in claim 14, wherein the interference canceller is further implemented to perform, based on the interference cancellation matrix, noise whitening or noise scaling on the signals of the packet or the reduced-interference signals of the packet.

19. The SoC as recited in claim 14, wherein:

the non-legacy LTF includes one of a high throughput LTF (HT-LTF), a very high throughput LTF (VHT-LTF), or a high efficiency LTF (HE-LTF); or the non-legacy signal field includes one of an HT signal field, a VHT signal field, or an HE signal field; or the non-legacy data field includes one of an HT data field, a VHT data field, or an HE data field.

20. The SoC as recited in claim 14, wherein:

to multiply signals of the packet with the interference matrix the interference canceller applies the interference cancellation matrix across an entire bandwidth of one or more signal and data fields of an HT packet, VHT packet, or HE packet; or to determine the interference cancellation matrix the interference canceller performs a per-tone cancellation to zero-force a signal representative of the interference.

* * * * *